(12) United States Patent
Bhorkar et al.

(10) Patent No.: US 10,778,486 B2
(45) Date of Patent: Sep. 15, 2020

(54) DISCOVERY REFERENCE SIGNAL DESIGN FOR LTE IN UNLICENSED BANDS

(71) Applicant: INTEL IP CORPORATION, Santa Clara, CA (US)

(72) Inventors: Abhijeet Bhorkar, Fremont, CA (US); Christian Ibars Casas, Santa Clara, CA (US); Seunghee Han, San Jose, CA (US); Hwan Joon Kwon, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/751,146

(22) PCT Filed: Dec. 26, 2015

(86) PCT No.: PCT/US2015/000446
§ 371 (c)(1),
(2) Date: Feb. 7, 2018

(87) PCT Pub. No.: WO2017/026980
PCT Pub. Date: Feb. 16, 2017

(65) Prior Publication Data
US 2018/0241602 A1 Aug. 23, 2018

Related U.S. Application Data

(60) Provisional application No. 62/204,939, filed on Aug. 13, 2015.

(51) Int. Cl.
H04L 27/26 (2006.01)
H04L 5/00 (2006.01)
(Continued)

(52) U.S. Cl.
CPC .......... *H04L 27/2613* (2013.01); *H04L 5/001* (2013.01); *H04L 5/0053* (2013.01);
(Continued)

(58) Field of Classification Search
CPC ............... H04L 27/2613; H04L 15/001; H04L 15/0053; H04L 5/0057; H04W 52/325; H04W 16/14; H04W 74/0808
(Continued)

(56) References Cited

U.S. PATENT DOCUMENTS

2012/0201164 A1* 8/2012 Jongren ................ H04L 5/0048
370/252
2013/0223294 A1* 8/2013 Karjalainen ........ H04W 64/003
370/277

(Continued)

OTHER PUBLICATIONS

"On DRS and initial signal in LAA." Source: ZTE. Agenda Item: 6.2.4.3. 3GPP TSG RAN WG1 Meeting #81, Fukuoka, Japan, May 25-29, 2015. R1-153015. 5 pages.
(Continued)

*Primary Examiner* — Christopher R Crompton
(74) *Attorney, Agent, or Firm* — Schwabe, Williamson & Wyatt, P.C.

(57) ABSTRACT

DRS signaling are described herein in which the DRS transmissions may be used in a Long Term Evolution (LTE)-Licensed Assisted Access (LAA) Secondary Cell that is subject to Listen Before Talk (LBT). In some implementations, the DRS transmission may include continuous symbol transmission in order to ensure that other nearby nodes, such as WiFi nodes, do not begin to transmit on the channel.

15 Claims, 10 Drawing Sheets

(51) Int. Cl.
*H04W 52/32* (2009.01)
*H04W 74/08* (2009.01)
*H04W 16/14* (2009.01)

(52) U.S. Cl.
CPC ......... *H04W 52/325* (2013.01); *H04L 5/0057* (2013.01); *H04W 16/14* (2013.01); *H04W 74/0808* (2013.01)

(58) Field of Classification Search
USPC ........................................................ 370/329
See application file for complete search history.

(56) References Cited

U.S. PATENT DOCUMENTS

| 2016/0142898 | A1* | 5/2016 | Poitau | H04W 76/14 370/329 |
|---|---|---|---|---|
| 2016/0308637 | A1* | 10/2016 | Frenne | H04L 5/0048 |
| 2016/0353500 | A1* | 12/2016 | Choi | H04W 52/383 |
| 2018/0069660 | A1* | 3/2018 | Yi | H04L 1/0067 |
| 2018/0115981 | A1* | 4/2018 | Kim | H04W 72/1215 |
| 2018/0206129 | A1* | 7/2018 | Choi | H04L 1/00 |
| 2018/0242283 | A1* | 8/2018 | Feng | H04L 5/001 |
| 2019/0313432 | A1* | 10/2019 | Belghoul | H04W 72/1278 |
| 2019/0364434 | A1* | 11/2019 | Kwak | H04W 74/0808 |

OTHER PUBLICATIONS

International Preliminary Report on Patentability dated Feb. 13, 2018 for International Application PCT/US2015/000446.
"Further discussion on discovery signal design for LAA." Source: CMCC. Agenda Item: 6.2.4.3. 3GPP TSG RAN WG1 Meeting #81, Fukuoka, Japan, May 25-29, 2015, R1-153031.
International Search Report and Written Opinion for PCT/US2015/000446 dated Apr. 7, 2016.
"DRS design for LAA", 3GPP Draft R1-152941, May 2015 (available at http://www.3gpp.org/ftp/Meetings_3GPP_SYNC/RAN1/Docs).
Panasonic, "DRS design for LAA", 3GPP Draft R1-152692, May 2015 (available at http://www.3gpp.org/ftp/Meetings_3GPP_SYNC/RAN1/Docs/).
"Overview on PH layer options for LAA design", 3GPP Draft R1-153011, May 2015 (available at http://www.3gpp.org/ftp/Meetings_3GPP_SYNC/RAN1/Docs/).
Intel Corporation, "Comparison of evaluation results for various UL LBT options", 3GPP TSG RAN WG1 Meeting #81 R1-153439, May 2015 (available at http://www.3gpp.org/ftp/tsg_ran/WG1_RL1/TSGR1_81/Docs).
3GPP, "Technical Specification Group Radio Access Network; Study on Licensed-Assisted Access to Unlicensed Spectrum; (Release 13)," 3GPP TR 36.889 V13.0.0 (Jun. 2015), LTE Advanced, 87 pages.
3GPP, "Technical Specification Group Radio Access Network; Evolved Universal Terrestrial Radio Access (E-UTRA); Multiplexing and channel coding (Release 12)," 3GPP TS 36.212 V12.5.0 (Jun. 2015), LTE Advanced, 94 pages.
ETSI, "Broadband Radio Access Networks (BRAN); 5 GHz high performance RLAN; Harmonized EN covering the essential requirements of article 3.2 of the R&TTE Directive," ETSI EN 301 893 V1.7.1 (Jun. 2012), 90 pages.
3GPP, "Technical Specification Group Radio Access Network; Evolved Universal Terrestrial Radio Access (E-UTRA); Physical channels and modulation (Release 12)," 3GPP TS 36.211 V12.6.0 (Jun. 2015), Lte Advanced, 136 pages.

* cited by examiner

DISCOVERY REFERENCE SIGNAL DESIGN
FOR LTE IN UNLICENSED BANDS

RELATED APPLICATIONS

The present application claims the benefit of U.S. Provisional Patent Application No. 62/204,939, which was filed on Aug. 13, 2015; and of PCT Application PCT/US15/00446, which was filed on Dec. 26, 2015, the contents of which are hereby incorporated by reference as though fully set forth herein.

BACKGROUND

The demand for wireless broadband data has consistently increased. Unlicensed spectrum (i.e., frequency spectrum that does not require a license from an appropriate regulating entity) is being considered by wireless cellular network operators to increase the capacity of existing services that are offered over licensed spectrum.

The use of unlicensed spectrum in the Third Generation Partnership Project (3GPP) Long Term Evolution-Advanced (LTE-A) system has been proposed as Licensed Assisted Access (LAA). Under LAA, the LTE standard is extended into unlicensed frequency deployments, thus enabling operators and vendors to maximally leverage the existing or planned investments in LTE hardware in the radio and core network.

Apart from the LAA operation considered in Release 13 of the 3GPP standard, LTE may also be operated via dual connectivity or the standalone LTE mode which may not require much assistance from the licensed spectrum Recently, a new LTE based technology "MuLTEfire" has been under consideration, requiring no assistance from the licensed spectrum to enable a leaner, self-contained network architecture that is suitable for neutral deployments where any deployment can service any device. The operation of LTE on the unlicensed spectrum without any assistance from licensed carrier will be referred to as standalone LTE-U herein.

One concern with LAA and standalone LTE-U is the co-existence of the LTE radio nodes and other radio access technologies (RATs), such as WiFi and/or other LAA networks deployed by other operators using other unlicensed radio nodes. To enable the co-existence of the LTE radio nodes and other unlicensed nodes, listen-before-talk (LBT) (also called Clear Channel Assessment (CCA)) has been proposed. LBT is a contention protocol in which the LTE radio node determines whether a particular frequency channel is already occupied (e.g., by a WiFi node) before using the particular frequency channel. That is, with LBT, data may only be transmitted when a channel is sensed to be idle.

In LTE, reference signals, such as Discovery Reference Signals (DRS), are transmitted to enable User Equipment (UEs) to "discover" an active channel. For example, a UE may sense the DRS to determine appropriate time and frequency compensation parameters for the channel. For licensed spectrum, the DRS may be periodically transmitted. Due to the unpredictability of LBT, however, for LTE-LAA and standalone LTE-U, periodic DRS transmissions may not be feasible.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED
EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

In existing 3GPP standards, such as the release 12 standard, DRS was designed to support secondary cells (SCells), such as small cells, in which the SCells are "turned off" for UEs except for the periodic transmission of DRS. The transmissions of the DRS can occur in DRS occasions that may have a periodicity of 40, 80 or 160 milliseconds (ms). The signals that are included in the DRS may include the Primary Synchronization Signals (PSS), Secondary Synchronization Signals (SSS), the Cell-specific Reference Signals (CRS), and optionally the Channel State Information Reference Signals (CSI-RS). A UE may be configured with a discovery measurement timing configuration (DMTC) that defines a time window within which the UE can expect the DRS to be received. While the DRS reception may occur anywhere in the DMTC, the UE may expect the DRS to be transmitted from a given cell so that the duration between successive DRS transmissions is fixed (e.g., 40, 80 or 160 ms).

In the context of LTE-LAA or standalone LTE-U, LBT requirements and the co-coexistence of LTE with WiFi (i.e., Institute of Electrical and Electronics Engineers (IEEE) 802.11-based wireless networking standards) may impose additional issues for DRS transmissions.

Various embodiments for DRS signaling are described herein in which the DRS transmissions may be used in an LAA SCell or standalone LTE-U that is subject to LBT (i.e., DRS in unlicensed frequency bands). In some implementations, the DRS transmission may include continuous Orthogonal Frequency-Division Multiplexing (OFDM) symbols in order to ensure that other nearby nodes, such as WiFi nodes, do not begin to transmit on the channel. The term "reservation signal" may be used herein to refer to a signal (which can be any arbitrary signal) that is used to reserve the channel from transmission by other nodes. The reservation signal may include reference signaling (RS), predetermined patterns, or other data. Symbols, corresponding to the reservation signal, may be transmitted in empty time slots to fill in the empty time slots.

Figure 1:
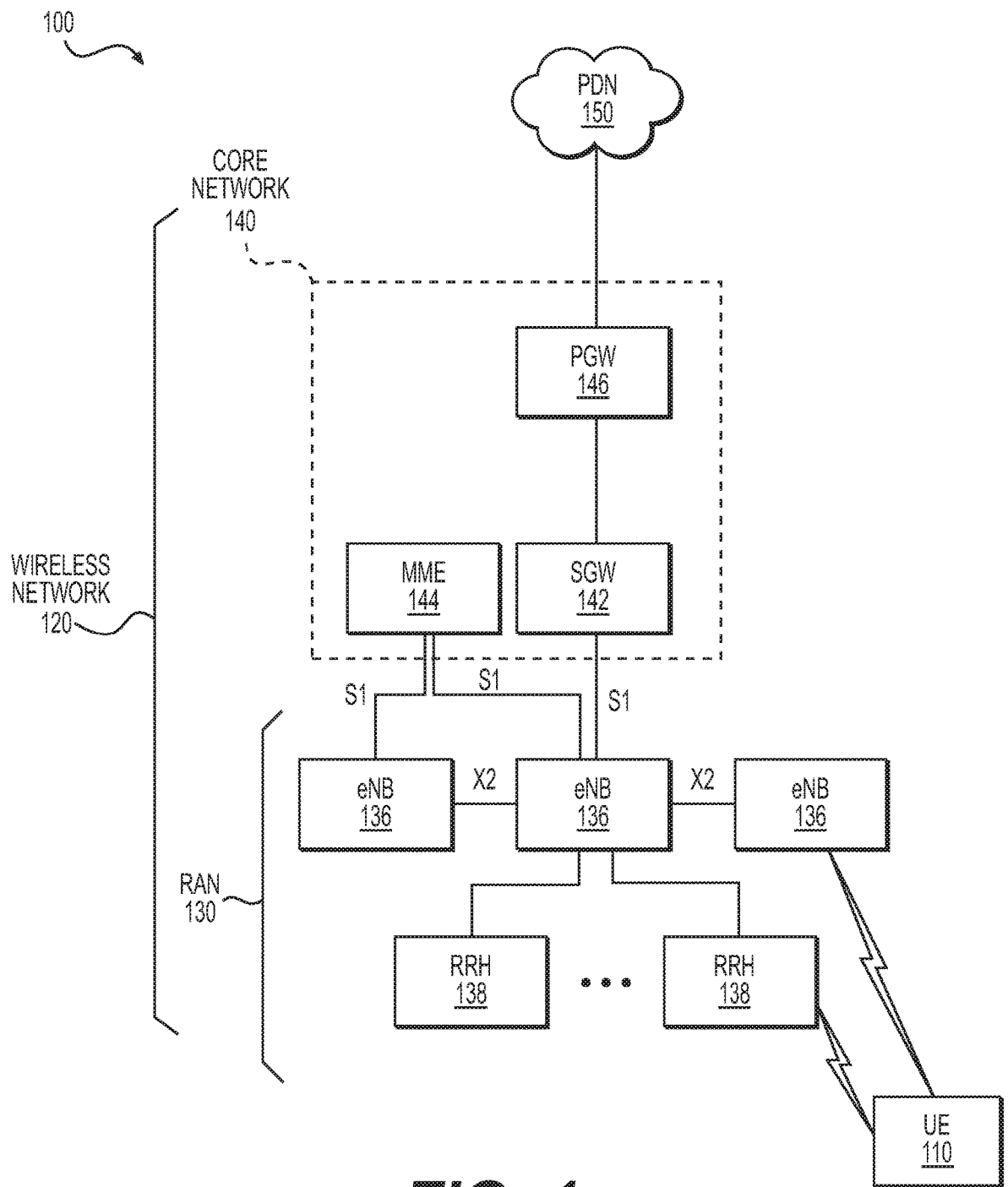
FIG. 1 is a diagram of an example environment in which systems and/or methods described herein may be implemented.

FIG. 1 is a diagram of an example environment 100, in which systems and/or methods described herein may be implemented. As illustrated, environment 100 may include User Equipment (UE) 110, which may obtain network connectivity from wireless network 120. Although a single UE 110 is shown, for simplicity, in FIG. 1, in practice, multiple UEs 110 may operate in the context of a wireless network. Wireless network 120 may provide access to one or more external networks, such as packet data network (PDN) 150. The wireless network may include radio access network (RAN) 130 and core network 140. RAN 130 may be a E-UTRA based radio access network or another type of radio access network. Some or all of RAN 130 may be associated with a network operator that controls or otherwise manages core network 140. Core network 140 may include an Internet Protocol (IP)-based network.

UE 110 may include a portable computing and communication device, such as a personal digital assistant (PDA), a smart phone, a cellular phone, a laptop computer with connectivity to a cellular wireless network, a tablet computer, etc. UE 110 may also include non-portable computing devices, such as desktop computers, consumer or business appliances, or other devices that have the ability to wirelessly connect to RAN 130.

UEs 110 may be designed to operate using LTE-LAA. For instance, UEs 110 may include radio circuitry that is capable of simultaneously receiving multiple carriers: a first, primary, carrier using licensed spectrum and a second carrier using unlicensed spectrum. The second carrier may correspond to, for example, the unlicensed 5 GHz spectrum. This spectrum may commonly be used by WiFi devices. A goal of LTE-LAA may be to not impact WiFi services more than an additional WiFi network on the same carrier.

UEs 110 capable of operating on the unlicensed band may be configured to make measurements to support unlicensed band operation, including providing feedback when the UE is in the coverage area of an LTE-LAA node. Once the connection is activated to allow use on the unlicensed band, existing Channel Quality Information (CQI) feedback may allow the evolved NodeBs (eNBs) 136 to determine what kind of quality could be achieved on the unlicensed band compared to the licensed band. Downlink only mode is particularly suited for situations where data volumes are dominated by downlink traffic.

RAN 130 may represent a 3GPP access network that includes one or more RATs. RAN 130 may particularly include multiple base stations, referred to as eNBs 136. eNBs 136 may include eNBs that provide coverage to a relatively large (macro cell) area or a relatively small (small cell) area. Small cells may be deployed to increase system capacity by including a coverage area within a macro cell. Small cells may include picocells, femtocells, and/or home NodeBs. Small cells may, in some situations, be operated as Secondary Cells (SCells), in which the macro cell (called the Primary Cell (PCell)) may be used to exchange important control information and provide robust data coverage and the SCell may be used as a secondary communication channel, such as to offload downlink data transmissions. eNBs 136 can potentially include remote radio heads (RRH), such as RRHs 138. RRHs 138 can extend the coverage of an eNB by distributing the antenna system of the eNB. RRHs 138 may be connected to eNB 136 by optical fiber (or by another low-latency connection). eNBs 136 may each include circuitry to implement the operations discussed herein.

In the discussion herein, an LTE-LAA or standalone LTE-U node may correspond to eNB 136 (small cell or macro cell) or RRH 138. The LTE-LAA node may also be referred to as an "LTE-LAA transmission point," "LTE-LAA transmitter," "LAA node," or "LAA eNB." For simplicity, eNB 136 will be discussed herein as corresponding to an LTE-LAA node. In some implementations, the LTE-LAA node (using unlicensed frequency) may be co-located with a corresponding eNB that uses licensed frequency. The licensed frequency eNBs and the LTE-LAA node may maximize downlink bandwidth by performing carrier aggregation of the licensed and unlicensed bands.

Core network 140 may include an IP-based network. In the 3GPP network architecture, core network 140 may include an Evolved Packet Core (EPC). As illustrated, core network 140 may include serving gateway (SGW) 142, Mobility Management Entity (MME) 144, and packet data network gateway (PGW) 146. Although certain network devices are illustrated in environment 100 as being part of RAN 130 and core network 140, whether a network device is labeled as being in the "RAN" or the "core network" of environment 100 may be an arbitrary decision that may not affect the operation of wireless network 120.

SGW 142 may include one or more network devices that aggregate traffic received from one or more eNBs 136. SGW 142 may generally handle user (data) plane traffic. MME 144 may include one or more computation and communication devices that perform operations to register UE 110 with core network 140, establish bearer channels associated with a session with UE 110, hand off UE 110 from one eNB to another, and/or perform other operations. MME 144 may generally handle control plane traffic.

PGW 146 may include one or more devices that act as the point of interconnect between core network 140 and external IP networks, such as PDN 150, and/or operator IP services. PGW 146 may route packets to and from the access networks, and the external IP networks.

PDN 150 may include one or more packet-based networks. PDN 150 may include one or more external networks, such as a public network (e.g., the Internet) or proprietary networks that provide services that are provided by the operator of core network 140 (e.g., IP multimedia (IMS)-based services, transparent end-to-end packet-switched streaming services (PSSs), or other services).

A number of interfaces are illustrated in FIG. 1. An interface may refer to a physical or logical connection between devices in environment 100. The illustrated interfaces may be 3GPP standardized interfaces. For example, as illustrated, communication eNBs 136 may communicate with SGW 142 and MME 144 using the S1 interface (e.g., as defined by the 3GPP standards). eNBs 136 may communicate with one another via the X2 interface.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of environment 100 may perform one or more functions described as being performed by another one or more of the devices of environment 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Figure 2:
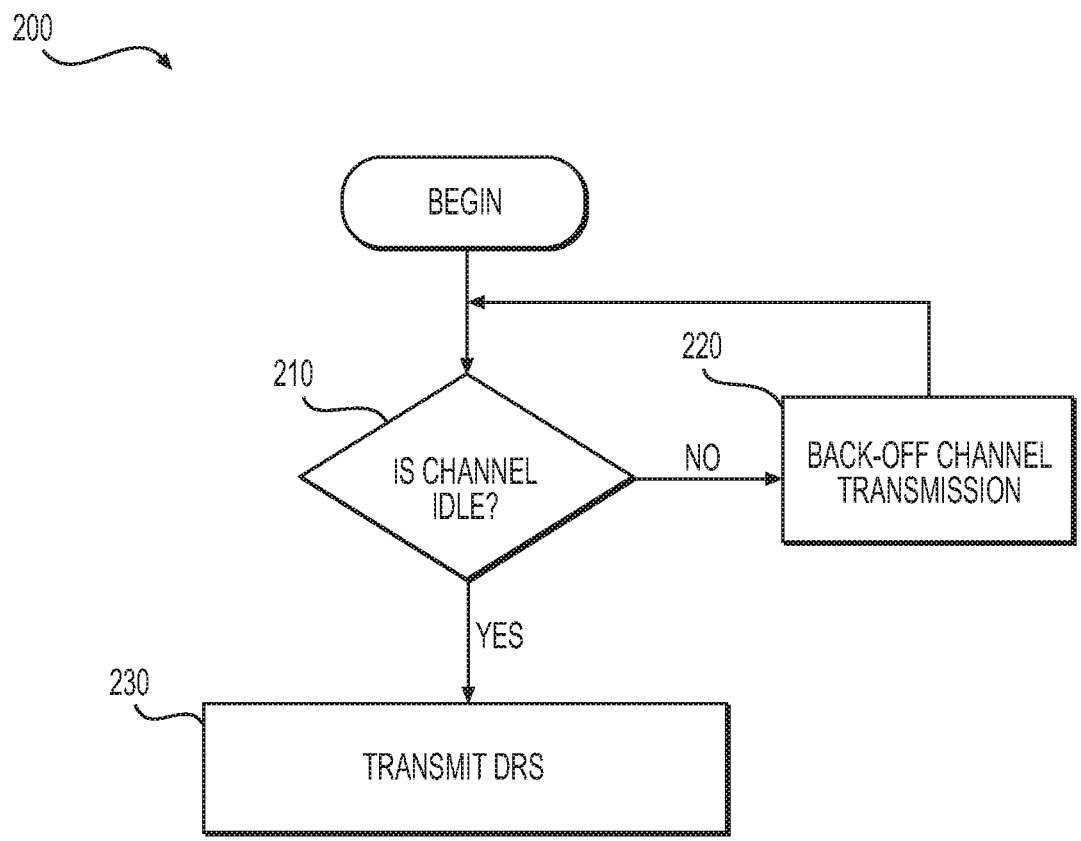
FIG. 2 is a flowchart illustrating a process that provides an overview of LBT and DRS transmission.

FIG. 2 is a flowchart illustrating a process 200 that provides an overview of LBT and DRS transmission. Process 200 may be performed by, for example, eNB 136 (i.e., by an eNB that acts as an LTE-LAA node).

Process 200 may include determining whether the channel, for which the data is to be transmitted, is idle (block 210). The channel may be an unlicensed frequency channel. The determination of whether a particular frequency channel is idle may include measuring the energy associated with the channel at the node and comparing the measured energy value to a threshold. In some implementations, the determination of whether the channel is idle may additionally involve physical carrier sensing to read information transmitted in the frequency channel. For example, for a WiFi transmission, the WiFi preamble or beacon may be read to obtain information.

When the channel is determined to not be idle (block 210—No), the eNB may perform a back-off procedure (block 220). The back-off procedure may include waiting a predetermined amount of time before attempting to use the channel again, waiting a random amount of time before attempting to use the channel again, or waiting an amount of time that is determined from another source (e.g., a WiFi preamble). In some implementations, the back-off procedure may potentially include the selection of a different frequency channel.

When the channel is determined to be idle (block 210—Yes), the DRS may be transmitted using the channel (block 230). The signals that are included in the DRS may include the PSS, the SSS, the CRS, and optionally CSI-RS. UE 110 may detect the DRS and, based on the content of the DRS, configure parameters appropriate for communicating (e.g., receiving downlink transmissions) on the channel. In this manner, LTE-LAA deployments may co-exist with other RATs or with LTE-LAA deployments from other network operators.

Figure 3:
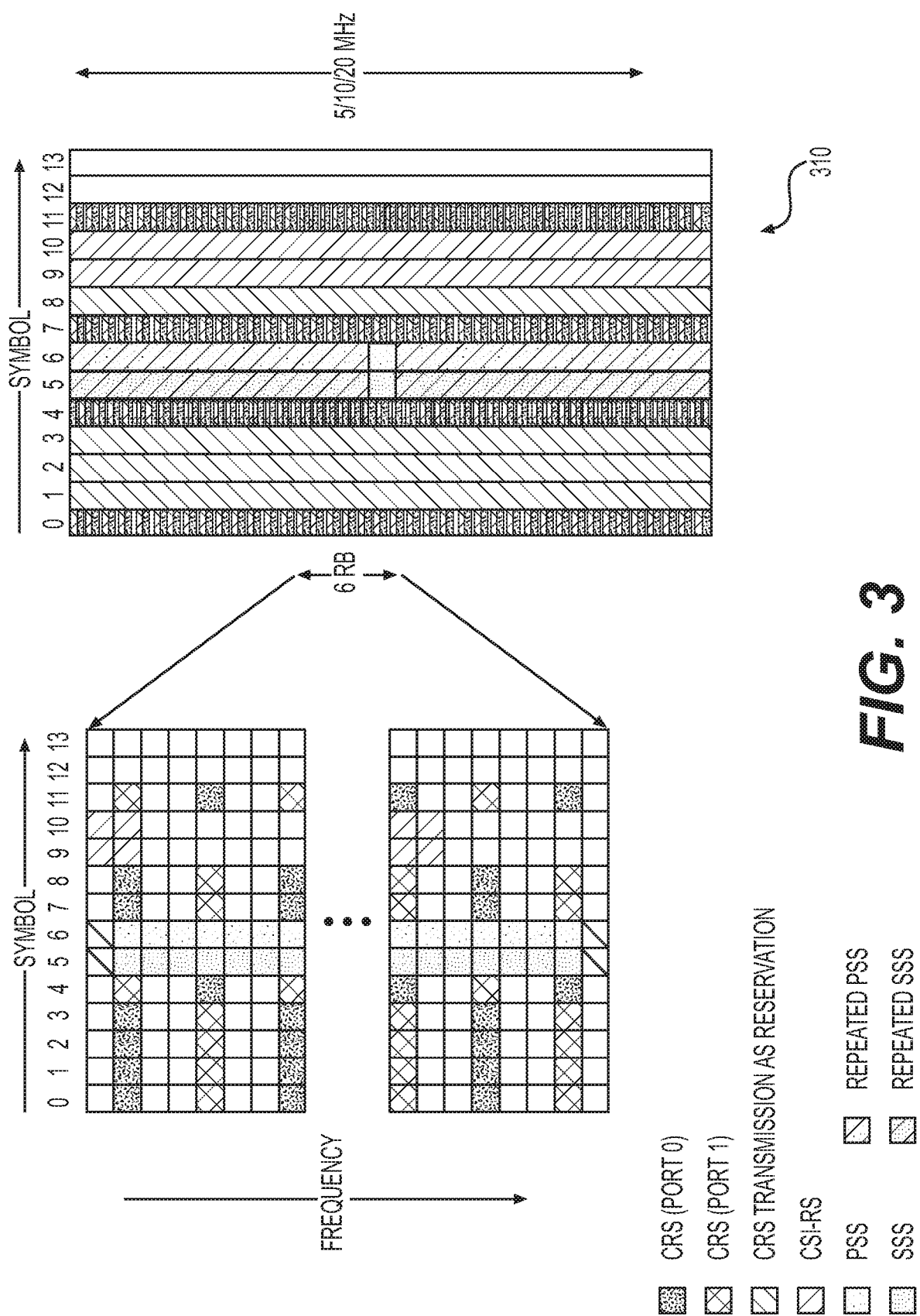
FIG. 3 is a diagram illustrating an example configuration, according to a first possible embodiment, for downlink transmission of the DRS in an LAA Secondary cell (SCell)

When detecting the DRS in LTE-LAA transmissions, it may be desirable for the detection of the DRS to be achieved, with high probability, even when the DRS location, due to LBT, is not known a-priori. FIG. 3 is a diagram illustrating an example configuration, according to a first possible embodiment, for downlink transmission of the DRS in an LAA SCell. In the embodiment shown in FIG. 3, a reservation signal is used to fill in empty symbols to thereby create a continuous DRS transmission. The continuous DRS transmission can increase the probability for eNB 136 110 to transmit the DRS and, by keeping the channel occupied, reduces the risk of channel interference by nearby transmission nodes (e.g., by a nearby WiFi AP detecting an unoccupied channel and attempting to use the channel).

FIG. 3 may particularly illustrate a channel map relating to the usage of resource elements (REs) in an LTE-LAA Orthogonal Frequency-Division Multiplexing (OFDM) transmission scheme. In FIG. 3, the frequency domain is represented on the vertical axes and the time domain on the horizontal axes.

As shown in FIG. 3, an LTE-LAA sub-frame 310, which may correspond to a 1 ms transmission interval, may be based on a particular carrier bandwidth (e.g., 5 MHz, 10 MHz, or 20 MHz). The total carrier bandwidth may be divided into a number of OFDM sub-carriers. For example, each sub-carrier may have a bandwidth of 15 kHz or 7.5 kHz. In a particular sub-frame, each sub-carrier may be used to transmit a particular number of symbols (illustrated as 14 symbols, labeled as symbols 0 to 13 in FIG. 13). A symbol may represent the smallest discrete part of a frame/sub-frame. In various LTE implementations, a symbol may represent 2, 4, or 6 bits per symbol.

A resource block (RB) may be defined as the smallest unit of resources that can be allocated to a particular user. A RB may include, for example, 12 or 24 sub-carries (i.e., an RB may be 12 or 24 sub-carriers wide). The center 6 RBs (frequency-wise), of sub-frame 310, are illustrated on the left-side of FIG. 3 in additional detail. As shown, each square may represent a resource element, which may be used to communicate a single symbol. Each row (of 14 squares) may represent a particular sub-carrier.

In FIG. 3, the DRS may be transmitted as the CRS, the PSS, the SSS, and the CSI-RS using the REs consisting of 12 OFDM symbols that are illustrated in FIG. 3. More particularly, the channel map shown in FIG. 3 may utilize an existing frame structure, as used in Release 12 of the 3GPP LTE standard, for transmission of the DRS but may include additional symbols used to transmit the CRS. In particular, symbols 1, 2, 3, and 8 of the 3GPP standard (release 12) do not use these symbols for the DRS transmission. Consistent with aspects described herein, and as shown in FIG. 3, however, the CRS signal may be transmitted in symbols 1, 2, 3, and 8 (e.g., as CRS REs) in addition to symbols 0 and 7. By including the CRS signal in these symbols, the DRS signal may be generally continuous in time, and may thus act as a "reservation signal" that can increase the probability for UE 110 to detect the DRS and, by keeping the channel occupied, may reduce the risk of channel interference by nearby transmission nodes (e.g., by a nearby WiFi AP detecting an unoccupied channel and then attempting to use the channel).

In one implementation, the pseudo-noise (PN) sequence to use for the CRS signal may be the sequence, as defined in 3GPP TS 36.211, section 7.2, initialized with:

$$c_{init}=2^{10} \cdot (7 \cdot (n_s+1)+l+1) \cdot (2 \cdot N_{ID}^{cell}+1)+2 \cdot N_{ID}^{cell}+N_{CP},$$

where l is the symbol position used for CRS position, and $N_{ID}^{cell}$ is the cell identifier (ID). Additionally, in some implementations, power boosting can be applied to the transmitted CRS symbols to increase the transmit power of the CRS, thereby maintaining low variation across OFDM symbols.

As is further shown in sub-frame 310, the PSS and SSS signals, which may normally only be transmitted in the center 6 RBs, may be repeated throughout the full carrier bandwidth (e.g., 5 MHz, 10 MHz, or 20 MHz). For instance, the existing PSS/SSS sequence (having a length of 62 symbols) and occupying the center 6 RBs (covering 1.4 MHz) may be copied across RBs in the entire frequency domain of sub-frame 310. Thus, the PSS/SSS signal may occupy the entire bandwidth of the sub-frame.

A CRS signal may be transmitted for each transmit antenna port. In the first embodiment, as shown in FIG. 3, two ports are supported, illustrated as ports 0 and 1.

Figure 4:
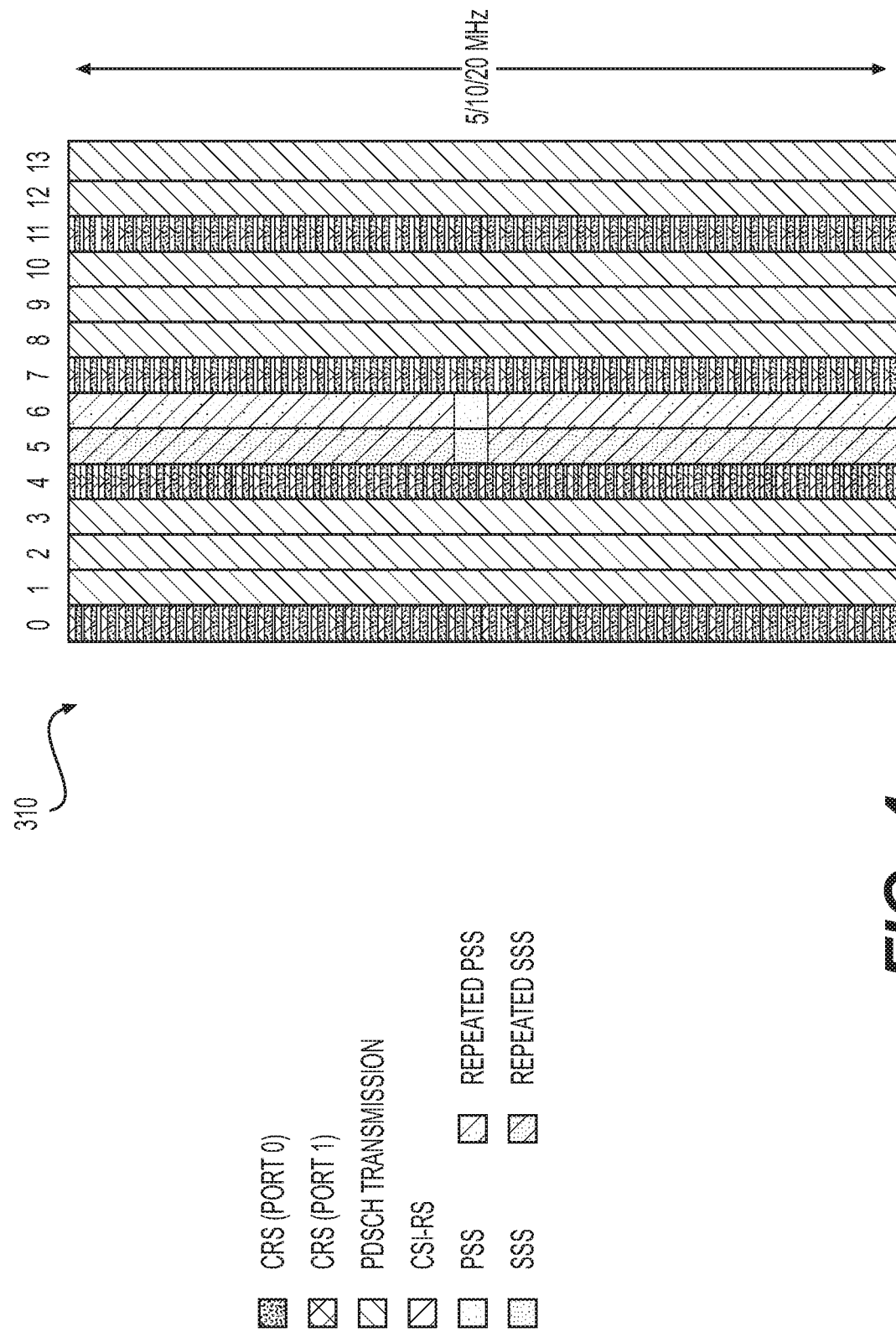
FIG. 4 is a diagram illustrating an example configuration, according to a second possible embodiment, for downlink transmission of the DRS in an LAA SCell.

FIG. 4 is a diagram illustrating an example configuration, according to a second possible embodiment, for downlink transmission of the DRS in an LAA SCell. In this embodiment, the Physical Downlink Shared Channel (PDSCH) may be used for transmission of the reservation signal. For example, as shown in FIG. 4, symbols 1, 2, 3, 8, 9, 10, 12, and 13 of sub-frame 310 may be used, by eNB 136, to transmit PDSCH. The PDSCH transmission may, include, for example, a predetermined or repeating pattern that can be recognized, by UE 110, as a reservation signal. Alternatively or additionally, the PDSCH may be embed or include the CRS. The PDSCH transmission may be performed over all of the sub-carriers in sub-frame 310. In some implementations, and as is also shown in FIG. 4, the PSS/SSS sequence may additionally be copied across the RBs in the entire frequency domain, in symbols 5 and 6, of sub-frame 310.

In one implementation of the second embodiment, the CRS transmissions may be performed on ports 0 and 1 and the CSI-RS transmission on ports 16 and 17.

Figure 5:
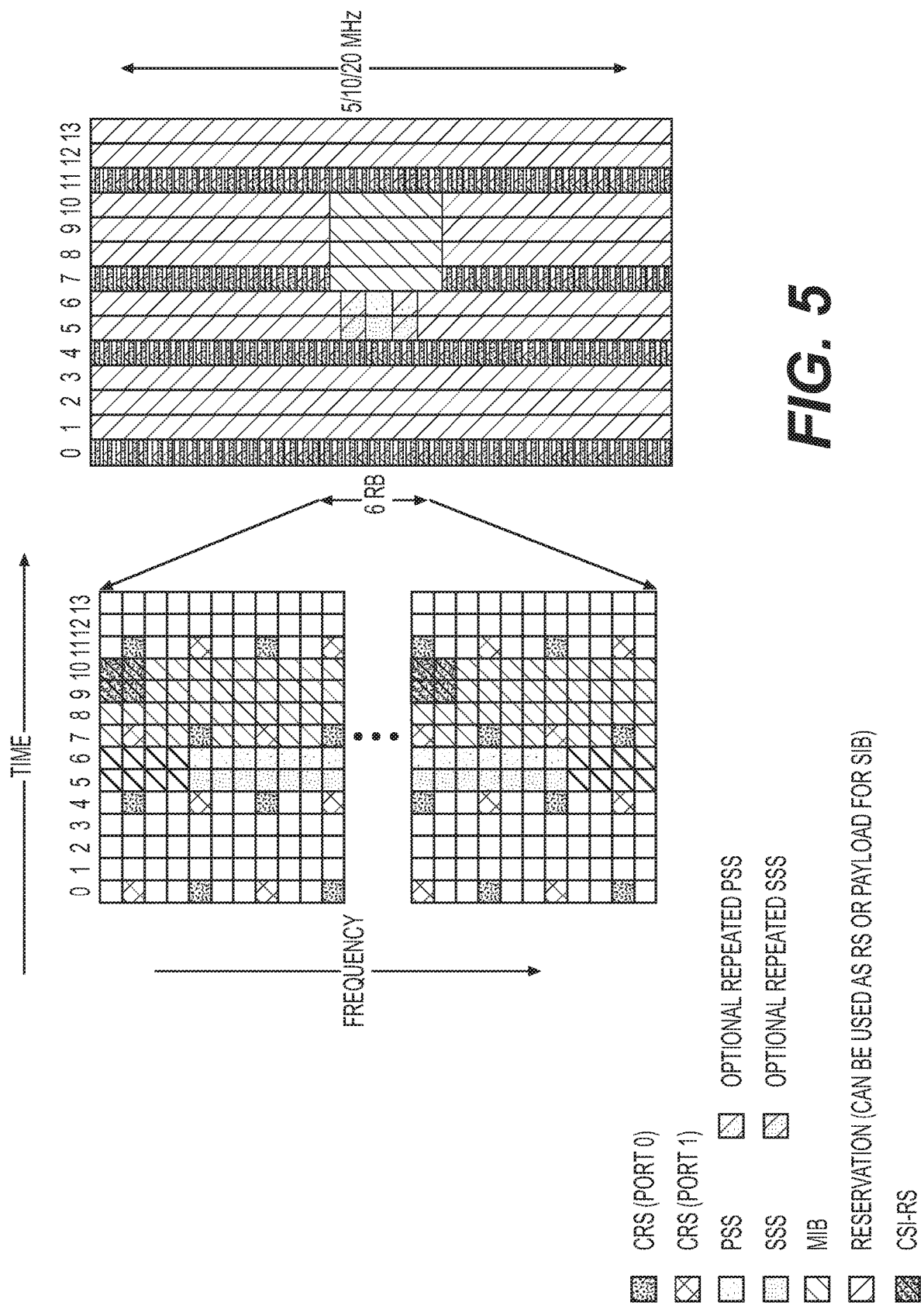
FIG. 5 is a diagram illustrating an example configuration, according to a third possible embodiment, for downlink transmission of the DRS in an LAA SCell.

FIG. 5 is a diagram illustrating an example configuration, according to a third possible embodiment, for downlink transmission of the DRS in an LAA SCell. In this embodiment, the DRS can be transmitted with the Master Information Block (MIB) in the Physical Broadcast Channel (PBCH). In LTE, the MIB is a System Information Block (SIB) that is broadcasted by the eNB in the downlink PBCH. The MIB may include 24 bits of information, including information relating to system bandwidth, frame numbering, and the number of eNB transmit antennas.

In one implementation of the third embodiment, and as shown in FIG. 5, the MIB may be transmitted in portions of symbols 7-10. The CRS may be transmitted, as illustrated, in symbols 0, 4, 7, and 11. An optionally repeated PSS and SSS can be transmitted, as illustrated, using symbols 5 and 6. Unused REs may be filled to implement the reservation signal. For instance, the unused REs may be used to carry Reference Signals (RSs) or SIB payload information that act as the reservation signal, and may be transmitted using symbols 1, 2, 3, 5, 6, 8, 9, 10, 12, and/or 13.

The third embodiment may be appropriate for standalone LAA operation in which a licensed carrier is not present and system information may therefore need to be transmitted in the unlicensed band.

Figure 6:
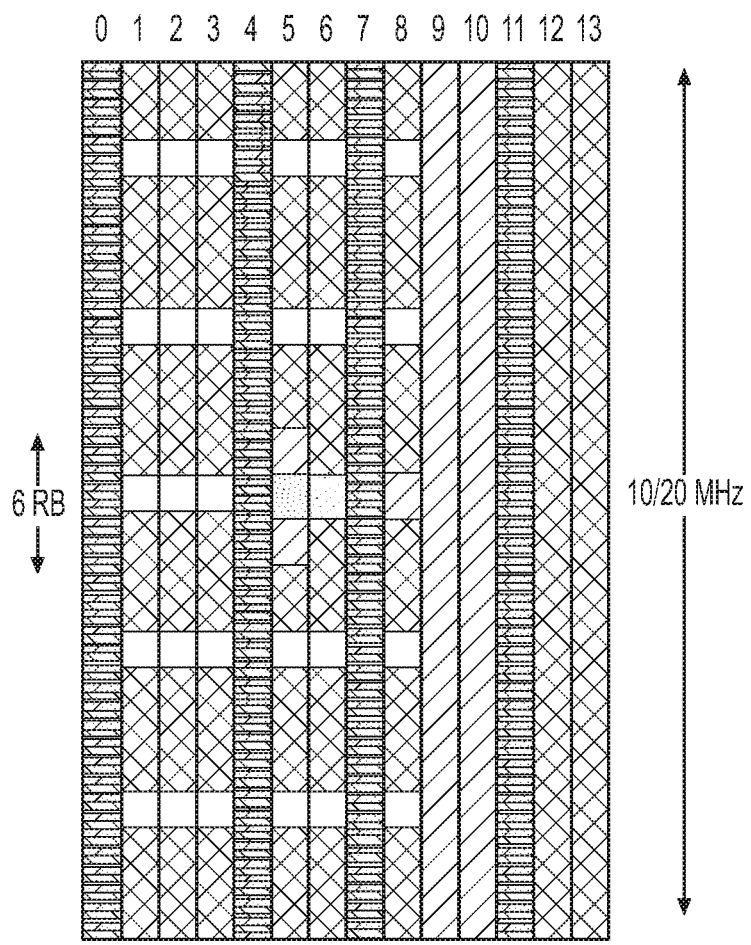
FIG. 6 is a diagram illustrating an example configuration, according to a fourth possible embodiment, for downlink transmission of the DRS in an LAA SCell.

FIG. 6 is a diagram illustrating an example configuration, according to a fourth possible embodiment, for downlink transmission of the DRS in an LAA SCell. In the fourth embodiment, a Ternary Synchronization Signal (TSS) may be used. This embodiment may be used in addition to the first or second embodiments.

The TSS may include a structure similar to that of the SSS, but may additionally encode, such as via a PN sequence, an operator identifier, such as a Public Land Mobile Network Identity (PLMN ID). A PLMN ID may be a six-digit value, resulting in $10^6$ possible distinct PLMN ID values. In one implementation, the six-digit PLMN ID value may be divided into three subparts, and thus three TSS sequences, each including two digits. The TSS sequence may thus be similar to the SSS sequence but encoding the PLMN ID digits instead of the cell group identifier.

As shown in FIG. 6, the TSS can be transmitted in symbol 8 and/or transmitted in symbol 5 (e.g., near the subcarriers used to transmit the SSS). By separating the TSS digits (e.g., into three two-digit subparts), complexity at UE 110 may be reduced. For example, if UE 110 detects that a two-digit subpart of the TSS does match any PLMN-IDs with which the UE is associated, the UE may refrain from decoding the other TSS subparts.

As is further shown in FIG. 6, and consistent with the first and second embodiments, the reservation signal may be transmitted in, for instance, symbols 1, 2, 3, 5, 6, 8, 12, and/or 13.

Figure 7A:
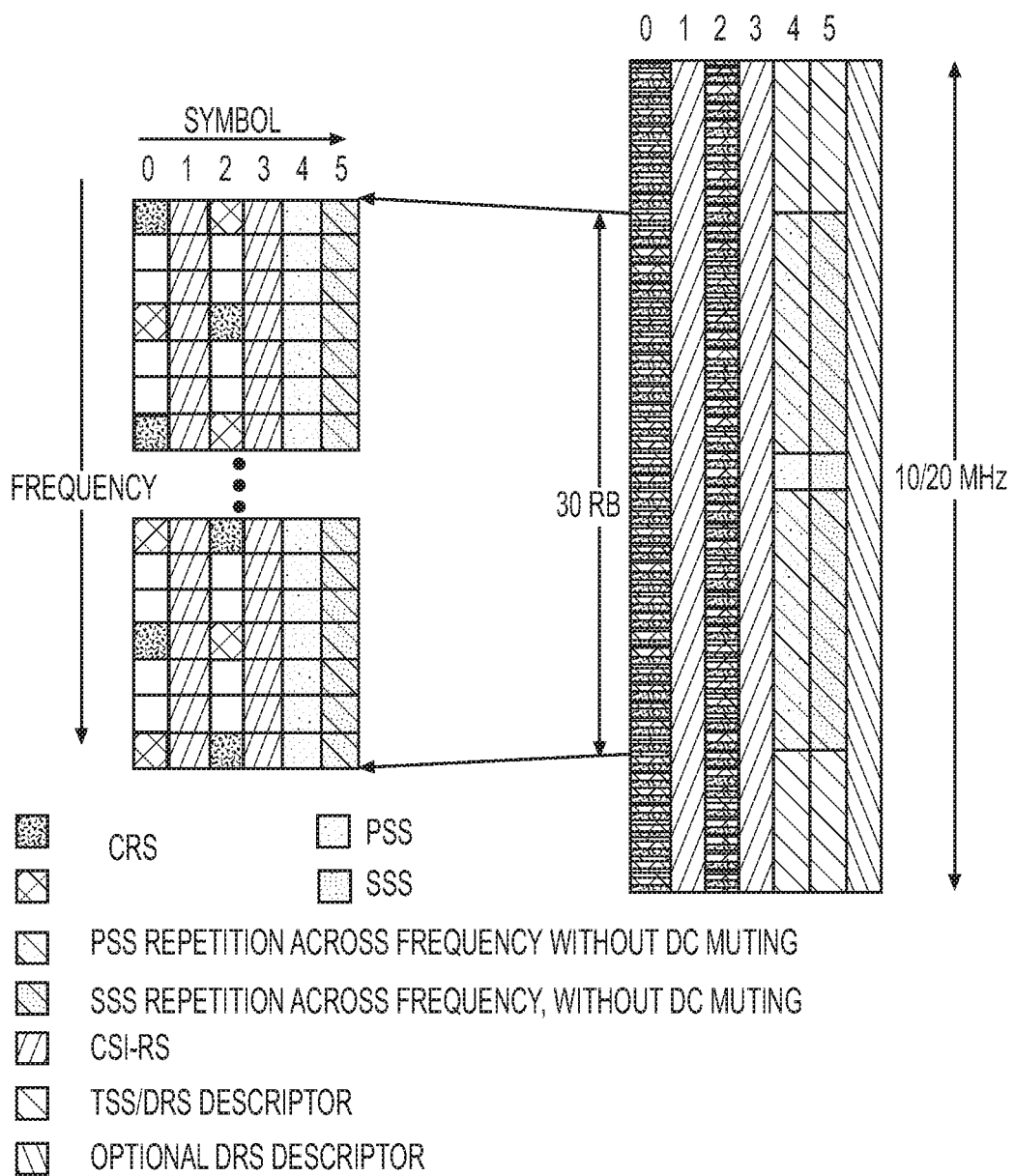
FIGS. 7A-7C are diagrams illustrating example configurations, according to a fifth possible embodiment, for downlink transmission of the DRS in an LAA SCell.
Figure 7B:
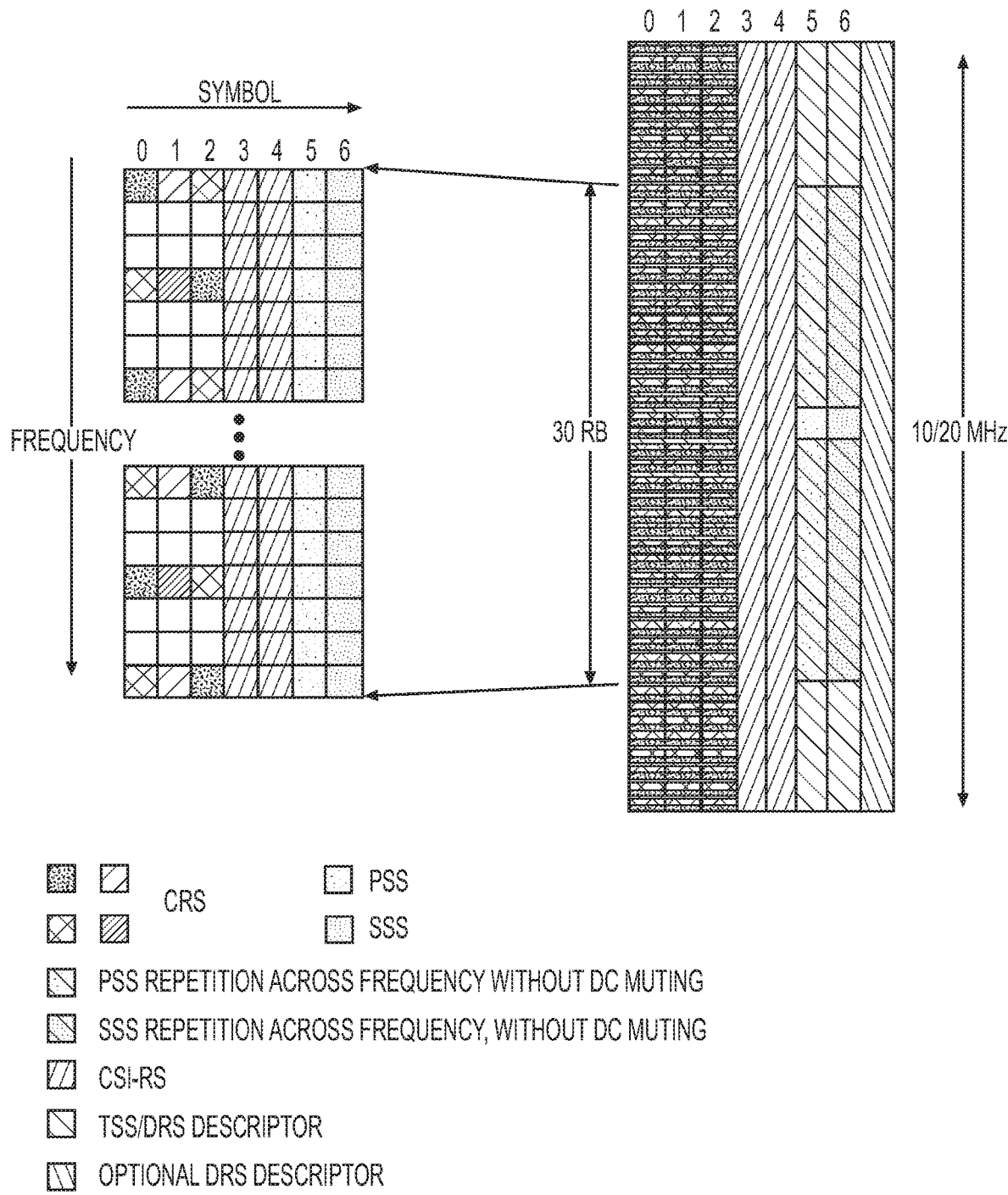
Figure 7C:
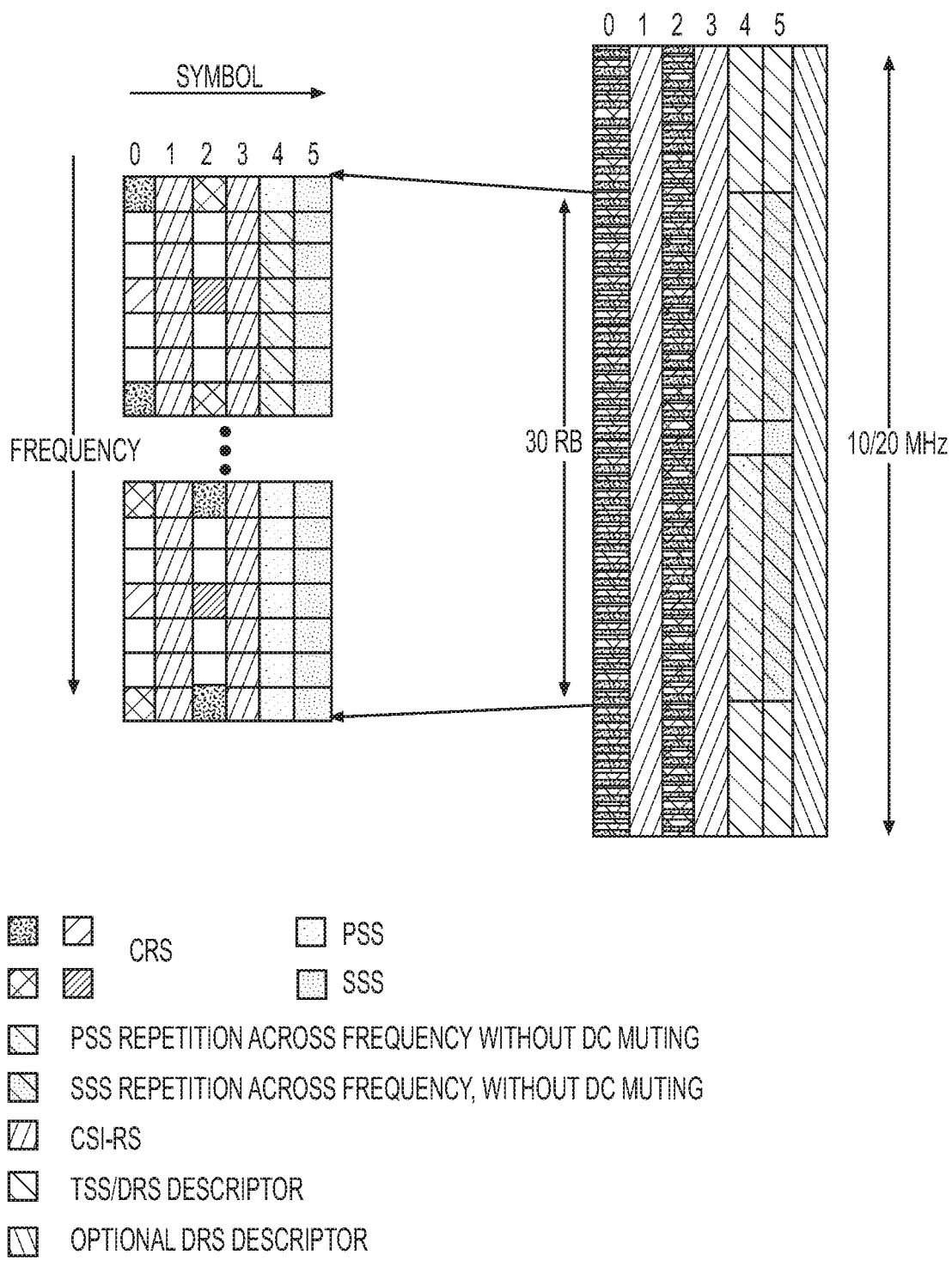

FIGS. 7A-7C are diagrams illustrating example configurations, according to a fifth possible embodiment, for downlink transmission of the DRS in an LAA SCell. In this embodiment, the DRS is structured to minimize the time duration of the DRS transmission (i.e., to compress the time duration) and to enable Radio Resource Management (RRM) and time/frequency synchronization.

In general, in the fifth embodiment, the symbol locations of the PSS and SSS signals may be exchanged relative to the first three embodiments. That is, the PSS signal may be transmitted at symbol 4 and the SSS signal at symbol 5. Reversing the location of the PSS and SSS signals may help in faster detection of the PSS/SSS signals.

Additionally, in the fifth embodiment, the operator ID, such as the PLMN ID, can be encoded in a TSS sequence. Alternatively, instead of using the TSS, a DRS descriptor may be used to determine the operator ID. For instance, the CRS and/or CSI-RS may be encoded with the operator ID (e.g., PLMN ID) and possibly other information, such as the Physical Cell Identifier (PCI). Alternatively or additionally, the DRS descriptor may be used to indicate other broadcast information.

FIG. 7A illustrates one possible implementation of the fifth embodiment. As shown, the PSS signal may be transmitted in symbol 4 and the SSS symbol may be transmitted in symbol 5. The PSS and SSS signals may be repeated in frequency to occupy, for example, the bandwidth corresponding to 30 RBs. Additionally, the CRS signal may be transmitted in portions of symbols 0 and 2. In this implementation, the two different CRS blocks indicate CRS support for two ports. The TSS (or the DRS descriptor) may be transmitted in the portions of symbols 4 and 5 for which the PSS/SSS signals are not present. Symbols 1 and 3 may be used to transmit the CSI-RS signal.

FIG. 7B illustrates one possible variation on the fifth embodiment that was discussed with reference to FIG. 7A. In this variation, the CRS signal may correspond to up to four antenna ports. Accordingly, four separate CRS signals are illustrated, each potentially corresponding to a different port. The CRS signals may be transmitted in symbols 0, 1, and 2. The CSI-RS signal may be transmitted in symbols 3 and 4, and the PSS and SSS signals transmitted using symbols 5 and 6, respectively.

FIG. 7C illustrates one possible variation on the fifth embodiment that was discussed with reference to FIG. 7A. In this variation, the CRS signal may correspond to up to four antenna ports and may be transmitted in symbols 0 and 2. The CSI-RS signal may be transmitted in symbols 1 and 3, and the PSS and SSS signals transmitted using symbols 4 and 5, respectively, and may be repeated to occupy 30 RBs. The TSS/PRS descriptor may be transmitted in the unoccupied REs of symbols 4 and 5, and optionally in symbol 6.

Downlink transmission of the DRS, in an LAA SCell, according to sixth embodiment, will next be discussed. In this embodiment, a floating DRS may be used, where the term "floating," as used herein, refers to the DRS location not being fixed to the sub-frame boundary. That is, the location of the DRS may vary within the sub-frame boundary. This embodiment may help to reduce the need for a reservation signal after the completion of LBT.

In one implementation, to reduce complexity at UE 110, the location of the DRS in the sub-frame may be placed such that the location of the PSS signal is not in the 1st (symbol 0) or 8th (symbol 7) symbol of the sub-frame, due to different Cyclic Prefix (CP) lengths from the rest of the symbols. Additionally, a DRS descriptor may be transmitted containing 16 bits for the PLMN ID and 4 bits that indicate the starting position of DRS. The 20-bit DRS descriptor may be transmitted using the symbols used for the PSS/SSS signals. For a 10 MHz sub-frame, the number of open resource elements in the PSS/SSS signals may be 960, which is sufficient to reliably transmit the 20-bit DRS descriptor. In some implementations, the DRS descriptor may optionally be transmitted in conjunction with any of the previous embodiments, as discussed with respect to FIGS. 3-6.

In transmitting the DRS descriptor, several mechanisms can be considered, including: the particular data format, the modulation scheme, the channel coding scheme, scrambling parameters, etc. For example:

The DRS descriptor can contain 10 bits, with 6 bits used for the PLMN ID and 4 bits to indicate the symbol location of the DRS starting point. A cyclic redundancy check (CRC) is added after the payload.

The DRS may be transmitted within a data burst without using a PDSCH transmission. In this case, a standalone DRS may be transmitted.

The DRS may be transmitted within a data burst without using a PDSCH transmission, but within the Physical Downlink Control Channel (PDCCH). In this case, the unoccupied symbols may be replaced using the CRS signal, as described previously.

If potential DRS transmission overlaps with the uplink sub-frame, then uplink grant may not be transmitted.

If potential DRS transmission overlaps with a fractional sub-frame consisting of less than 14 symbols, then DRS may not be transmitted.

A number of advantages may be obtained from the above-described embodiments for the DRS. For example, DRS detection from a cell may be performed, by UE 100, based on a single DRS occasion (sub-frame). Further, the detection of DRS may be achieved with high probability, even when, due to LBT, the location (in-time) of the DRS signal may not be known by the UE. Repeating the PSS/SSS signals, across frequency, as described above, may be lead to an improved DRS detection probability.

Additionally, because the above-described DRS transmissions can include continuous OFDM symbols, interference by neighboring nodes, such as WiFi nodes, may be avoided, as the neighboring nodes will detect transmit energy, associated with the carrier frequencies, and will thus perform an LBT back-off operation. The reservation signal, as discussed-above, can be used to ensure that the DRS transmission is continuous. Additionally, with the techniques discussed above, energy variation among DRS symbols may be kept to a minimum. The LBT algorithm performance significantly depends on the energy sensing mechanism. Keeping the energy variation to a minimum can reduce LBT uncertainty which may otherwise lead to collisions among nearby transmitting nodes.

Additionally, as described above, the DRS may maintain relatively low power variation across the symbols. Reference signals may be transmitted with power boosting (up-to 20 dB) when DRS is transmitted without PDSCH. The reservation signal should be used to differentiate the DRS transmission outside PDSCH transmission and compensate for the power boosting. CRS and CSI-RS power boosting can be different depending on the number ports used for CRS/CSI-RS transmission.

Additionally, in some implementations, and as described above, the DRS may contain the operator ID to reduce PCI collision and confusion. Further, for DRS transmission within a PDSCH burst and without PDSCH may follow the same resource element positions of PSS/SSS/CRS/CSI-RS. The reservation signal may not be not transmitted with PDSCH transmission.

As used herein, the term "circuitry" or "processing circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
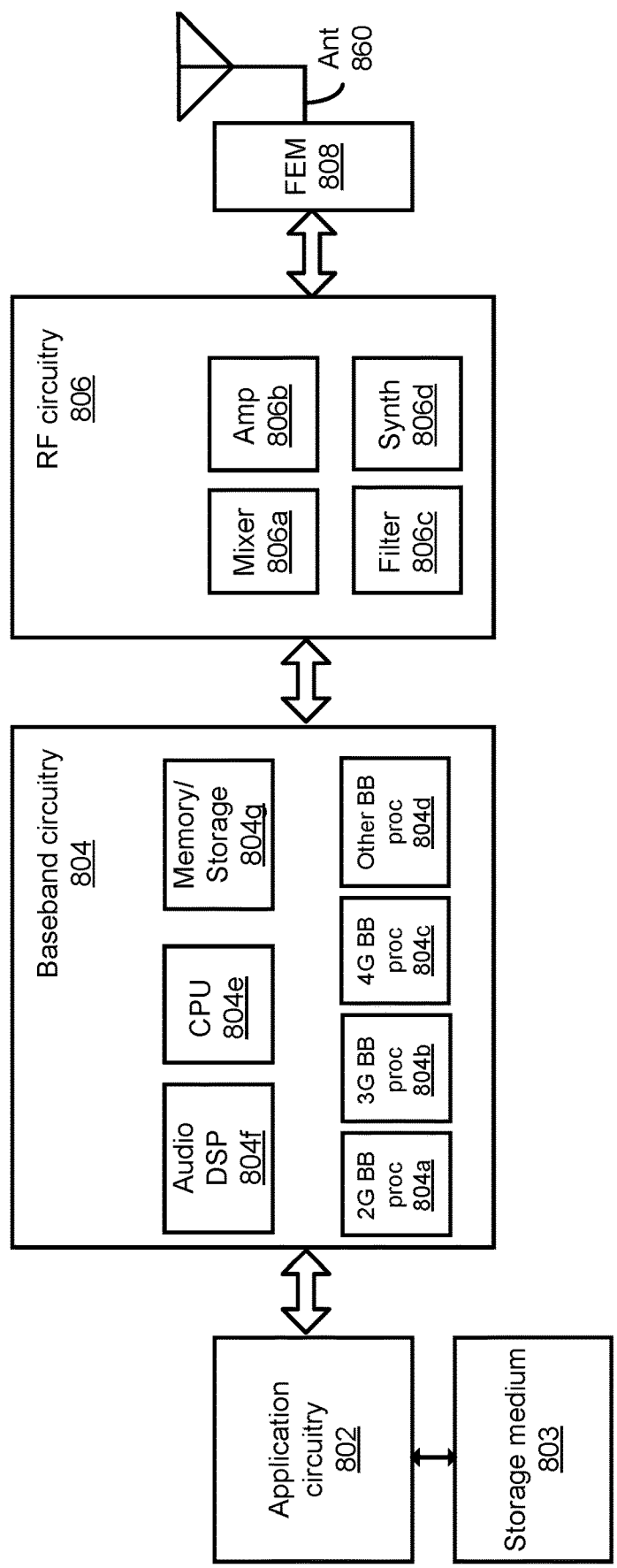
FIG. 8 illustrates example components of an electronic device.

Embodiments described herein may be implemented into a system using any suitably configured hardware and/or software. FIG. 8 illustrates, for one embodiment, example components of an electronic device 800. In embodiments, the electronic device 800 may be a user equipment UE, an eNB, a transmission point, or some other appropriate electronic device. In some embodiments, the electronic device 800 may include application circuitry 802, baseband circuitry 804, Radio Frequency (RF) circuitry 806, front-end module (FEM) circuitry 808 and one or more antennas 860, coupled together at least as shown.

Application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage, such as storage medium 803, and may be configured to execute instructions stored in the memory/storage to enable various applications and/or operating systems to run on the system. In some implementations, storage medium 603 may include a non-transitory computer-readable medium. Application circuitry 802 may, in some embodiments, connect to or include one or more sensors, such as environmental sensors, cameras, etc.

Baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 8G, etc.). The baseband circuitry 804 (e.g., one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some implementations, baseband circuitry 604 may be associated with storage medium 803 or with another storage medium.

In embodiments where the electronic device 804 is implemented in, incorporates, or is otherwise part of an LTE-LAA transmission point, the baseband circuitry 104 may be to: identify one or more parameters related to the LTE-LAA transmission point, wherein the LTE-LAA transmission point is in a network that includes a plurality of LTE-LAA transmission points, respective LTE-LAA transmission points having respective parameters; and identify, based on a listen-before-talk (LBT) procedure related to identification of channel occupancy status of respective LTE-LAA transmission points in the plurality of LTE-LAA transmission points that the LTE-LAA transmission point has an unoccupied channel. RF circuitry 806 may be to transmit a signal based on the identification.

In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 804f may be include elements for compression/decompression and echo cancellation and may include other suitable processing elements in other embodiments.

Baseband circuitry 804 may further include memory/storage 804g. The memory/storage 804g may be used to load and store data and/or instructions for operations performed by the processors of the baseband circuitry 804. Memory/storage 804g may particularly include a non-transitory memory. Memory/storage for one embodiment may include any combination of suitable volatile memory and/or non-volatile memory. The memory/storage 804g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 804g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals.

Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature downconversion and/or upconversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and/or direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806*d* may be a fractional-N synthesizer or a fractional N/N+6 synthesizer, although the scope of the embodiments is not limited in this respect as other types of frequency synthesizers may be suitable. For example, synthesizer circuitry 806*d* may be a delta-sigma synthesizer, a frequency multiplier, or a synthesizer comprising a phase-locked loop with a frequency divider.

The synthesizer circuitry 806*d* may be configured to synthesize an output frequency for use by the mixer circuitry 806*a* of the RF circuitry 806 based on a frequency input and a divider control input. In some embodiments, the synthesizer circuitry 806*d* may be a fractional N/N+6 synthesizer.

In some embodiments, frequency input may be provided by a voltage-controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+6 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 860, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 860.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 860.

In some embodiments, the electronic device 800 may include additional elements such as, for example, memory/storage, display, camera, sensors, and/or input/output (I/O) interface. In some embodiments, the electronic device of FIG. 8 may be configured to perform one or more methods, processes, and/or techniques such as those described herein.

A number of examples, relating to implementations of the techniques described above, will next be given.

In a first example, an eNB that functions as a LTE-LAA node may comprise comprising circuitry to: perform a LBT operation before downlink transmission to UE using unlicensed frequency channels, the LBT operation determining when a particular frequency channel is unoccupied; and transmit, when the channel is determined to be unoccupied, DRS as an LTE-LAA transmission, the DRS including: a reservation signal, the reservation signal including one or more symbols that fill in empty time slots in the LTE-LAA transmission to create a continuous DRS transmission.

In example 2, the subject matter of example 1, may further include wherein the DRS additionally includes Primary Synchronization Signals (PSS), Secondary Synchronization Signals (SSS), and Cell-specific Reference Signals (CRS).

In example 3, the subject matter of example 2, or any of the examples herein, may further include wherein the DRS additionally includes Channel State Information Reference Signals (CSI-RS).

In example 4, the subject matter of example 2, or any of the examples herein, may further include wherein the PSS and the SSS are repeated in the frequency domain.

In example 5, the subject matter of example 2, or any of the examples herein, may further include wherein the continuous DRS transmission covers twelve continuous LTE symbols.

In example 6, the subject matter of example 2, or any of the examples herein, may further include wherein the DRS additionally includes an operator identifier that is encoded as a pseudo-random sequence.

In example 7, the subject matter of example 6, or any of the examples herein, may further include wherein the operator identifier includes a six digit value that is transmitted in three subparts.

In example 8, the subject matter of example 1, or any of the examples herein, may further include wherein the circuitry includes: baseband circuitry, Radio Frequency (RF) circuitry, front-end module (FEM) circuitry, and one or more antennas to transmit the DRS.

In a ninth example, an evolved NodeB (eNB) may comprise a plurality of transmission ports; and circuitry to: perform a LBT operation before downlink transmission to UE using unlicensed frequency channels, the LBT operation determining when a particular frequency channel is unoccupied; and transmit DRS on unlicensed frequency channels that are determined to be unoccupied, the DRS being associated with a LTE sub-frame and including: Primary Synchronization Signals (PSS), Secondary Synchronization Signals (SSS), and Cell-specific Reference Signals (CRS), the CRS signals including different CRS signals for different ones of the transmission ports, wherein the PSS and the SSS are repeated in the frequency domain of the sub-frame.

In example 10, the subject matter of example 9, or any of the examples herein, may further include wherein the DRS additionally includes a reservation signal to fill in empty time slots of the DRS to create a continuous DRS transmission.

In example 11, the subject matter of example 9, or any of the examples herein, may further include wherein the DRS additionally includes Channel State Information Reference Signals (CSI-RS).

In example 12, the subject matter of example 9, or any of the examples herein, may further include wherein the DRS additionally includes an operator identifier that is encoded as a pseudo-random sequence.

In example 13, the subject matter of example 12, or any of the examples herein, may further include wherein the operator identifier includes a six digit value that is transmitted in three subparts.

In example 14, the subject matter of example 9, or any of the examples herein, may further include wherein the DRS transmission covers twelve continuous LTE symbols In example 15, the subject matter of example 1 or 10, or any of the examples herein, may further include wherein Cell-specific Reference Signals (CRS) are used as the reservation signal.

In example 16, the subject matter of example 2 or 9, or any of the examples herein, may further include wherein the circuitry of the eNB is further to: boost transmitted power of the CRS to reduce power variation in a sub-frame.

In example 17, the subject matter of example 1 or 10, or any of the examples herein, may further include wherein the reservation signal is transmitted via an LTE Physical Downlink Shared Channel (PDSCH).

In example 18, the subject matter of example 1 or 9, or any of the examples herein, may further include wherein the DRS is transmitted via an LTE Physical Broadcast Channel (PBCH).

In example 19, the subject matter of example 1 or 9, or any of the examples herein, may further include wherein a location of the DRS, within a sub-frame, is variable.

In a 20th example, a computer readable medium may contain program instructions for causing one or more processors to: control performance of a LBT operation before downlink transmission to UE using unlicensed frequency channels, the LBT operation determining when a particular frequency channel is unoccupied; and transmit, when the channel is determined to be unoccupied, DRS as LTE-LAA transmission, the DRS including a reservation signal, including one or more symbols to fill in empty time slots to create a continuous DRS transmission.

In example 21, the subject matter of example 20, or any of the examples herein, may further include wherein the DRS additionally includes Primary Synchronization Signals (PSS), Secondary Synchronization Signals (SSS), and Cell-specific Reference Signals (CRS).

In example 22, the subject matter of example 21, or any of the examples herein, may further include wherein the DRS additionally includes Channel State Information Reference Signals (CSI-RS).

In example 23, the subject matter of example 22, or any of the examples herein, may further include wherein the PSS and the SSS are repeated in the frequency domain.

In example 24, the subject matter of claim 20, or any of the examples herein, may further include wherein the DRS additionally includes an operator identifier that is encoded as a pseudo-random sequence.

In example 25, the subject matter of claim 24, or any of the examples herein, may further include wherein the operator identifier includes a six digit value that is transmitted in three subparts.

In example 26, the subject matter of example 20, or any of the examples herein, may further include wherein Cell-specific Reference Signals (CRS) are used as the reservation signal.

In example 27, the subject matter of claim 20, or any of the examples herein, may further include wherein the reservation signal is transmitted via an LTE Physical Downlink Shared Channel (PD SCH).

In a 28th example, an eNB may include means for performing a LBT operation before downlink transmission to UE using unlicensed frequency channels, the LBT operation determining when a particular frequency channel is unoccupied; and means for transmitting, when the channel is determined to be unoccupied, DRS as an LTE-LAA transmission, the DRS including a reservation signal, including one or more symbols that fill in empty time slots to create a continuous DRS transmission.

In example 29, the subject matter of example 28, may further include wherein the DRS additionally includes Primary Synchronization Signals (PSS), Secondary Synchronization Signals (SSS), and Cell-specific Reference Signals (CRS).

In example 30, the subject matter of example 28, or any of the examples herein, further include wherein the DRS additionally includes Channel State Information Reference Signals (CSI-RS).

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals have been described with regard to FIG. 2, the order of the signals may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit ("ASIC") or a field programmable gate array ("FPGA"), or a combination of hardware and software.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. An apparatus for an evolved NodeB (eNB) that functions as a Long Term Evolution (LTE)-Licensed Assisted Access (LAA) node, comprising:
an interface to radio frequency (RF) circuitry; and
one or more baseband processors to:
perform a sensing operation, via the RF interface, before transmission to User Equipment (UE) using unlicensed frequency channels, the sensing operation determining when a particular frequency channel is idle; and
generate, for transmission via the RF interface, and when the channel is determined to be idle, discovery signals as an LTE-LAA transmission, the discovery signals being transmitted as twelve consecutive Orthogonal Frequency-Division Multiplexing (OFDM) symbols to create a continuous transmission of the discovery signals,
wherein discovery signals are to be transmitted without a physical downlink shared channel (PDSCH) and are to include first signals, including synchronization or reference signals, transmitted in a first set of OFDM symbols of the twelve consecutive OFDM symbols and a reservation signal, including cell-specific reference signals (CRS), in a second set of OFDM symbols of the twelve consecutive OFDM symbols, wherein the first set and the second set are nonoverlapping.

2. The apparatus of claim 1, wherein the discovery signals include Primary Synchronization Signals (PSS), Secondary Synchronization Signals (SSS), and CRS.

3. The apparatus of claim 2, wherein the discovery signal additionally include Channel State Information Reference Signals (CSI-RS).

4. The apparatus of claim 2, wherein the discovery signals include a PSS/SSS sequence occupying six center Resource Blocks (RBs) copied, in a frequency domain, across all RBs of a channel bandwidth.

5. The apparatus of claim 2, wherein the discovery signals additionally include an operator identifier that is encoded as a pseudo-random sequence.

6. The apparatus of claim 5, wherein the operator identifier includes a six digit value that is transmitted in three subparts.

7. The apparatus according to claim 2, wherein the apparatus is further to: boost transmitted power of the CRS to reduce power variation in a sub-frame.

8. The apparatus according to claim 1, wherein the discovery signals are first discovery signals and the one or more baseband processors are to generate, for transmission via the RF interface, second discovery signals to be transmitted with a PDSCH, wherein the second discovery signals are to include the first signals without the reservation signal.

9. The apparatus according to claim 1, wherein the discovery signals are transmitted via an LTE Physical Broadcast Channel (PBCH).

10. The apparatus according to claim 1, wherein a location of the discovery signals, within a sub-frame, is variable.

11. One or more non-transitory, computer-readable media containing program instructions for causing one or more processors to:
control performance of a sensing operation before transmission to User Equipment (UE) using unlicensed frequency channels, the sensing operation determining when a particular frequency channel is unoccupied; and
transmit, when the channel is determined to be unoccupied, discovery signals as Long Term Evolution (LTE)-Licensed Assisted Access (LAA) transmission, wherein the discovery signals are to be transmitted without a physical downlink shared channel (PDSCH) and are to include first signals, including synchronization or reference signals, transmitted in a first set of Orthogonal Frequency-Division Multiplexing (OFDM) symbols of twelve consecutive OFDM symbols that carried the discovery signals and a reservation signal, including Cell-Specific Reference Signals (CRS), in a second set of OFDM symbols of the twelve consecutive OFDM symbols, wherein the first and the second set are nonoverlapping.

12. The one or more non-transitory, computer-readable media of claim 11, wherein the discovery signals additionally include Primary Synchronization Signals (PSS), Secondary Synchronization Signals (SSS), and CRS.

13. The one or more non-transitory, computer-readable media of claim 12, wherein the discovery signals additionally include Channel State Information Reference Signals (CSI-RS).

14. The one or more non-transitory, computer-readable media of claim 12, wherein the discovery signals include a PSS/SSS sequence occupying six center Resource Blocks (RBs) copied, in a frequency domain, across all RBs of a channel bandwidth.

15. The one or more non-transitory, computer-readable media of claim 11, wherein one or more components signals of the first signals or the reservation signals are power boosted to decrease power variation of the discovery signals across the 12 consecutive OFDM symbols.

* * * * *